United States Patent [19]

Seeger

[11] 4,128,324
[45] Dec. 5, 1978

[54] THREE-DIMENSIONAL PHOTOGRAPHY USING INCOHERENT LIGHT

[76] Inventor: Alfred Seeger, Am Steinern Kreuz 45, 6100 Darmstadt, Fed. Rep. of Germany

[21] Appl. No.: 748,501

[22] Filed: Dec. 8, 1976

[30] Foreign Application Priority Data

Dec. 12, 1975 [DE] Fed. Rep. of Germany ....... 2556034

[51] Int. Cl.² ............................................. G03B 35/00
[52] U.S. Cl. ................................................. 354/112
[58] Field of Search ............... 354/110, 114, 115, 116, 354/112; 352/60, 61; 353/7; 96/40, 44; 350/12

[56] References Cited

U.S. PATENT DOCUMENTS

| 1,882,424 | 11/1932 | Ives | 353/7 |
| 1,935,471 | 11/1933 | Kanolt | 354/112 |
| 2,794,380 | 6/1957 | Rehorn | 354/115 |
| 2,815,310 | 12/1957 | Andersen | 96/40 X |
| 3,301,154 | 1/1967 | Stewart et al. | 354/112 |
| 3,611,899 | 10/1971 | Ataka et al. | 354/114 |
| 3,683,773 | 8/1972 | Dudley | 354/112 |
| 3,772,976 | 11/1973 | Strope | 354/112 X |
| 3,903,531 | 9/1975 | Yevick | 354/115 X |

FOREIGN PATENT DOCUMENTS

477702 10/1951 Canada ..................................... 354/115

Primary Examiner—Donald A. Griffin
Attorney, Agent, or Firm—Michael J. Striker

[57] ABSTRACT

A recording medium comprises a photographic plate and an aperture-raster plate parallel to but spaced from the photographic plate. The aperture-raster plate is provided with a honeycombed pattern of small apertures. Light emanating from an illuminated object is directed toward the side of the recording medium provided with the aperture-raster plate, and the constituent light rays pass through the apertures and are registered upon the photographic plate both with respect to intensity and direction. Thereafter, the photographed object is three-dimensionally reproduced by illuminating the recording medium with incoherent light incident upon the recording medium in the direction opposite to that in which the observer of the reproduction views the recording medium.

16 Claims, 10 Drawing Figures

THREE-DIMENSIONAL PHOTOGRAPHY USING INCOHERENT LIGHT

BACKGROUND OF THE INVENTION

The invention relates to a method of photographically recording and three-dimensionally reproducing an object so as to present different views of the object as considered from the directions of differently located observers.

It is well known to use a camera having an objective and a diaphragm to record an object on a photographic plate or film. A narrow section of the light radiating from the object is received for recording purposes, corresponding to a certain viewpoint, making for a one-viewpoint method. Furthermore, by setting the distance between the photographic plate and the objective in correspondence to a desired sharpness setting, it is essentially a single object plane or a single strip of object space which is projected onto the photographic plate. The rest of the information contained in the object light is lost, and accordingly a photographic plate exposed in this way and thereafter developed produces an image which, in the first place, corresponds to a single viewpoint and which, in the second place, does not have any three-dimensional effect.

Three-dimensional (stereoscopic) methods are known in which each eye of the human observer sees only an associated half of the total image, with a three-dimensional impression resulting in the mind of the human viewer as a result of fusing of the two half images. These methods involve synchronized operation of two cameras which are spaced apart a distance corresponding to normal eye spacing; upon subsequent reproduction of the recorded image, steps must be taken to assure that each eye of the viewer receives only the associated half of the total image. These known methods are accordingly quite expensive. However, in contrast to the one-viewpoint methods referred to above, a certain three-dimensional character is achieved. These stereoscopic methods can be characterized as a special case of two-viewpoint methods, but with the exception that the spacing of the cameras to correspond to eye spacing still leads, in the end, to only a single view of the object as a whole. In any event, the human viewer of the reproduction is confined to a single position relative to the three-dimensional object whose image is being viewed.

An entirely different three-dimensional recording technique involves the use of holography. This involves the reproducible storing of the light-wave field emanating from an illuminated object in the form of a hologram somewhat comparable to a photographic plate. What is actually recorded is an interference pattern between a bundle of light rays emanating from an illuminated object and a bundle of reference light rays emanating from the source of illumination. The use of storable information derived from interference phenomena necessitates the use of a source of coherent light, in the form of a laser, for both recording and reproduction purposes. For color or multicolor recording and reproduction, a plurality of corresponding monochromatic laser light sources are required. The need for laser light sources, which are very expensive and low in efficiency compared to the equipment needed for daylight and artificial-light photography, seriously limits the present use and future prospects of holographic three-dimensional picture taking and reproduction.

The insufficient illumination attributable to the low-efficiency operation of laser light sources is one of the main reasons for the shadowy and unnatural appearance encountered in holographic reproduction. Furthermore, the short wavelength of the light in question, plus the use of interference phenomena to effect information storage, make for a very marked sensitivity of the holographic picture to motion of any kind. This makes holography of very little use for making pictures of animate objects. On the other hand, holography does constitute a true multi-viewpoint recording method in which the human viewer can observe the reproduced object from different sides, and even from all sides (360° holos). The present stage of the holographic art is such that objects larger than about 2 × 2 × 2 m cannot be holographed.

SUMMARY OF THE INVENTION

It is a general object of the invention to provide a method of the type discussed above wherein the human observer of the reproduced image of the recorded object can see the object from viewpoints all around at least part of the object and perceive the spatial character of the object. In particular, it is contemplated to provide a method which can be practiced using only ordinary daylight or incoherent artifical light and which produces high-quality, true-to-life reproductions of the object.

This object, and others explained below, can be met, according to one advantageous concept of the invention, by recording the light emanating from an illuminated object within a predetermined range of viewpoints upon a 3D recording medium, the recording of such light being effected both with respect to intensity and direction. Thereafter, the 3D recording medium is illuminated with diffuse light travelling in direction opposite to the gaze of the viewer to effect reproduction of the recorded 3D image.

This most general aspect of the present invention is based upon the recognition that an optimal solution to the 3D problem can be achieved if the light emanating from the illuminated object at the moment of exposure can be reproducibly stored and more specifically, the information indicative of both the intensity and direction of such light being reproducibly stored.

The intensity of the light emanating from an illuminated object can be readily enough characterized by its effect upon a photographic plate. However, to define the direction of each light ray, it is necessary to record for each light ray information regarding two spaced points. In this way, each light vector, characterized by its intensity and direction, and accordingly the light emanating from an illuminated object, can be registered, with the stored information thereafter being reproduced by effecting suitable illumination of the recording medium.

In accordance with these basic considerations, the inventive method advantageously involves the use of a photographic plate for recording information concerning the intensity of the light rays emanating from the illuminated object, and the use of this photographic plate in conjunction with an auxiliary aperture-raster plate provided on that side of the photographic plate facing the object, for recording information regarding the direction of the light emanating from the object. When the 3D recording medium made up of the photographic plate and aperture-raster plate is exposed to light, there passes through each aperture in the raster plate a light bundle whose aperture angle relative to object space is determined by the aperture width and the thickness of the aperture plate.

Accordingly, each aperture in the raster plate is comparable to a small pinhole camera and produces upon the photographic plate a respective image. In this way, the photographic plate registers a plurality of individual images corresponding to the number of raster apertures. Moreover, if the spacing between the aperture-raster plate and the photographic plate is precisely maintained, these individual images will not overlap with one another. Additionally, these many individual images are produced with pinhole-camera sharpness and without the need for focusing optics. All of the light passing through any one raster aperture will have an effect upon the photographic plate and will contribute to the formation of the complete individual image associated with that aperture. These many individual images, in conjunction with their associated raster apertures, make possible reproduction of the original object light, both with respect to intensity and direction.

When the exposed, and possibly developed, 3D recording medium is illuminated for reproduction purposes, the illuminating light rays have substantially the same effect upon the human observer as they would have had had the observer been present during the original exposure through the aperture-raster. The direction of each ray is determined by two intersection points in the aperture-raster plate (by two apertures) and by one point on the photographic plate (by one image point); the corresponding light ray intensity is determined by the brightness of the image point on the photographic plate.

Evidently, depending upon his viewing location, the human observer will be reached by light rays corresponding to a narrow section of the object light, corresponding to a certain viewpoint relative to the object. This means that the human observer will be presented with different views of the object if he changes his viewing location relative to the illuminated 3D recording medium. Accordingly, the method in question is a true multi-viewpoint method in the sense discussed above; it is possible for the viewer to walk around the reproduced image within a seemingly continuous angular range of viewing locations. As described below, this angular range is determined by the disposition of the 3D recording medium relative to the object during illumination and in particular by the dimensions of the 3D recording medium and its spacing from the object.

Furthermore, for each viewing location which the human observer assumes, there is achieved a reproduction having a spatial character. This is because each eye of the human observer, in correspondence to interocular spacing, perceives its own image. For each viewing location which the human observer assumes, the viewer is afforded a stereoscopic effect in the sense of the two viewpoint methods referred to earlier. This advantage can be easily achieved without special measures, because with a sufficiently fine aperture-raster plate having a multitude of apertures, all the light rays present during the recording of the object can be later on reproduced substantially completely. In addition, known stereoscopic methods presupposed proper orientation between a line joining the two eyes of the observer and a line joining the two reproduced stereo images, precluding tilting of the observer's head; this difficulty does not arise with the method in question.

The illumination of the 3D recording medium with diffuse light for reproduction purposes can be carried out in different ways and with different results. According to an advantageous concept, if the human viewer is located in the image space (at the side of the recording medium provided with the photographic plate), the recording medium is illuminated from within the object space (at the side of the recording medium provided with the aperture-raster plate). In that event, the light originally emanating from the illuminated object but intercepted by and fixed upon the 3D recording medium, is recreated and passes through the 3D recording medium in its original direction. As a result, the observer sees behind the 3D recording medium a virtual image of the reproduced object.

For example, with this type of illumination, an exposed and (if necessary) developed 3D recording medium can be built into the wall of a building and illuminated from behind for reproduction purposes; for example, it could be incorporated within the outer wall of a building and illuminated from behind by natural daylight. A viewer inside the building and standing before the 3D recording medium will have the impression not so much of an image, but instead of an actual window through which he can gaze. As with a glass window, when the observer nears the illuminated recording medium, he will see a greater expanse, corresponding to the increased aperture angle. This example makes clear not only the advantages inherent in the invention, but also the sheer amount of information which can be recorded on a relatively small 3D recording medium. Cost is low both with respect to illumination, whether by daylight or artificial light and, for a given amount of information, the amount of recording medium required is small.

The invention contemplates another advantageous way of effecting the illumination. The 3D recording medium is illuminated from within the image space, and the observer stands in the object space at a distance from the 3D recording medium exceeding the original object distance. Proceeding in this manner, the original ray directions present during the recording operation are now all reversed. As a result, the observer, who must stand at a sufficient distance from the 3D recording medium, will view a real, not a virtual image of the reproduced object. The object space accommodating the recording medium will be reproduced like a stage located in front of the recording medium.

When effecting illumination from this direction, it must be considered that, absent measures to the contrary, spatial relationships will be reversed, so that for example a recorded convex object will seem concave to the observer. However, this can be prevented by means of position reversal —an expedient well known in the photographic arts; the first-produced image is recorded again from the position of the observer, after which it can be reproduced without spatial relationship reversal.

The inventive concept includes additional expedients known in the photographic arts. For example, it is possible to make from an illuminated 3D recording medium copies of increased or reduced scale; the photographic plate of the recording medium is copied, and the copy then is provided with a new aperture-raster plate keeping the original dimensional and spatial relationships intact. It is also to be noted that the size of the reproduced object is dependent upon the original distance between the object and the recording medium and upon the distance between the recording medium and the subsequent observer of the reproduced image.

The concepts of the present invention are appliable not only to still pictures but also to motion pictures. In the latter case, the registering and reproduction of an image sequence is effected using a stationary aperture-raster plate and a photographic film strip moved relative thereto. The film strip corresponds to a series of photographic plates arranged in succession.

The invention also contemplates a 3D recording medium to be used in the practice of the inventive method. In its simplest form, this recording medium is comprised of a photographic plate and an aperture-raster plate arranged parallel to each other with a fixed spacing. The conditions and relationships to be maintained fixed, as well as the most advantageous dimensioning for the breadth or diameter of the raster apertures, their spacing, the thickness of the aperture-raster plate, and the distance between the photographic plate and the aperture-raster plate, are discussed in greater detail further below.

According to one advantageous concept for the 3D recording medium, the facing surfaces of the photographic plate and aperture-raster plate are fixedly attached to opposite surfaces of a transparent spacing plate. This makes for a simple one-piece recording medium and assures that the mutual arrangement of the photographic plate and the aperture-matrix plate during recording will correspond to the arrangement of the photographic plate and matrix plate during reproduction. At this point, it should be noted that the expression "plate" (as in photographic plate, aperture-raster plate, or spacing plate) is not to be understood as referring exclusively to a rigid body, but as also comprehending thin flexible material which can be trained about a curving transport path, pulled off a supply roll and wound up on a take-up roll.

According to a further concept, the aperture-raster plate comprises two identical aperture-raster foils arranged parallel to each other and in register with each other. This expedient is of particular advantage with regard to manufacture of the aperture-raster plate. As explained in detail below, what may often be needed is a very fine aperture-raster plate having a relatively great thickness. The use of aperture-raster foils greatly facilitates the production of such raster plates. Furthermore, thin aperture-raster foils can be provided with extremeley fine and precisely drawn aperture-rasters, using techniques known in the photographic arts.

When the aperture-raster plate is made up of two aperture-raster foils, it is advantageous that the two foils be affixed to opposite sides of a transparent spacing foil. In this way, the requisite plate thickness can be achieved by correspondingly selecting the thickness of the spacing foil, and relative shifting between the two aperture-raster foils can be avoided. Furthermore, as explained below, such a spacing foil can be designed to serve additional purposes.

In a preferred embodiment of the 3D recording medium, the apertures in the aperture-raster plate are arranged in a honeycomb pattern having triaxial symmetry. This matter makes for an essentially uniform distribution of raster apertures with approximately constant spacing between adjoining apertures. Experience has shown that such an arrangement of raster apertures bothers the observer the least and permits the eyes of the observer to quickly accommodate themselves to the reproduced object, whereupon the structure of the 3D recording medium or of the aperture raster thereon ceases to be perceived altogether.

It has also proved advantageous to increase the honeycomb character of the aperture raster by making each raster a regular (equiangular, equal-sided) hexagon. In that event, neighboring raster apertures are always separated from each other by little strips of constant breadth, which further contributes to the aforementioned accommodation of the observer's eyes to the structure of the 3D recording medium. However, it should be noted that it is also possible to utilize 3D recording media in which the raster apertures are of quadratic or circular shape. Particularly with very fine aperture rasters, manufacturing considerations make the use of circular apertures preferable.

It was explained above that the inventive method can be performed using natural daylight and/or diffuse artificial lighting. However, it is also possible to perform the initial exposure of the 3D recording medium using, for example, roentgen radiation, which may be of interest particularly in medical and materials-testing applications. The illumination of the 3D recording medium for reproduction purposes can be effected as described above with daylight or artifical light. To make possible the exposure of the 3D recording medium using roentgen radiation, the invention contemplates providing the portions of the raster-aperture plate surrounding the raster apertures with a roentgen-radiation-impervious shielding material.

According to another advantageous concept, the apertures of the aperture raster are enlarged and are separated from each other only by narrow strips of the raster plate material, with collector lenses built into the raster apertures. In the exemplary 3D recording media described earlier, use was not made of focussing optics, and accordingly the entire object space was projected onto the photographic plate with a depth of focus extending up to infinity. However, with a 3D recording medium in which collector lenses are provided in the apertures of the raster plate, an object plane is focussed quite sharply onto the photographic plate (It is to be noted that this makes the recording medium unsuitable for roentgen exposure). Accordingly, such a recording medium having built-in collector lenses makes possible elimination of small raster aperture size without substantial loss of image sharpness. The advantage of such an embodiment is that the photographic plate will be exposed to light of greater intensity, because considerably more light passes through the collector lenses than through small apertures, the strips of plate material between adjoining small apertures being relatively wide.

For reproduction purposes, the illumination of a 3D recording medium having such built-in collector lenses can be performed only with reversed direction, i.e., from within the image space or, alternatively expressed, from the side of the recording medium provided with the photographic plate, unless the special measures described below are taken.

The collector-lens aperture-raster plate can be comprised, as described above, of two aperture-raster foils with an intermediate spacing foil, with the collector lenses being constituted by portions of the intermediate spacing foil. In that event, the spacing foil should be made of a material having the highest possible refractive index. The collector lenses themselves can be formed by pressing the two aperture-raster foils against opposite sides of the spacing foil, while the latter is still in a plastically deformable condition.

Advantageously, the collector lenses are so designed so as to have respective focal lengths which increase from one collector lens to the next when proceeding in direction towards an edge of the 3D recording medium. Evidently, such individual selection of the collector-lens focal lengths presents no particular problems when employing the production technique just referred to.

The purpose of this focal-length expedient, which is particularly applicable when the 3D recording medium has a large surface area, is to take into account the increase in object distance as one proceeds from the middle of the recording medium to its edges, so that sharp images of the object will be projected onto all portions of the recording medium.

It may be at times desired to be able to effect the reproduction using illumination originating not from the image space but instead from the object space. This can be accomplished with the embodiment in question by suitable modification.

Specifically, to effect reproduction using illumination originating in the object space, the large-aperture lens-aperture-raster plate is replaced by a small-aperture aperture-raster plate having the same aperture distribution and aperture center point locations.

This expedient is based upon the recognition that the rays passing through the centers of the lenses during the earlier recording exposure were not deflected; accordingly, these central rays, which are the only ones which can pass through the very small apertures of the small-aperture raster plate, can be used for reproduction purposes. Care must be taken to ensure that the small apertures of the substitute raster plate assume exactly the positions occupied by the centers of the collector lenses of the large-aperture lens-aperture-raster plate.

The invention also contemplates a camera for recording three-dimensional images of objects according to the first-described inventive method. This camera comprises a non-transparent, interiorly blackened case provided with a closable opening and a holder for positioning an exposable plate in the camera casing. According to the invention, the camera case opening has dimensions corresponding to those of the exposable plate of the 3D recording medium; the holder for positioning the recording medium is provided directly back of the camera case opening, with the opening having associated with it a wall activatable like a quick-action shutter for briefly opening the camera case, to effect the exposure of the recording medium.

The inventive camera just described differs from conventional cameras in that it has neither an objective nor a small aperture such as in a pinhole camera; instead, it has an exposure opening of large area corresponding in size to substantially one entire wall of the camera case. The brief opening of the quick-action shutter wall results in a correspondingly brief exposure of the 3D recording medium through all the apertures in the aperture-raster plate. The opening in the camera casing, which as indicated above corresponds to the size of the 3D recording medium, can for example be 1 × 1 m or 1 × 2 m. If the object to be recorded is of considerable size, and/or if it is desired that the recorded image afford the observer a large angular range of possible viewpoints, then a plurality of such cameras can be arranged side-by-side, with the individually exposed 3D recording media from the different cameras then being combined to form a panoramic 3D image carrier. Alternatively, it would also be possible to arrange the cameras or the 3D image carriers not in a plane in front of the object space, but instead around the object or object space.

In this connection, according to a further inventive concept, the camera is specially designed to accommodate a 3D image carrier which is curved and concave with respect to the camera case opening. The exposed curved 3D image carrier can be formed into a cylinder such that an observer can observe the recorded object from all sides, using an interior illumination with diffuse light. Sometimes it will suffice to use a 3D image carrier strip formed into a short cylinder positioned at eye level, even where the recorded object is actually of considerably greater height.

It is to be noted that the inventive cameras just referred to can be dispensed with in some circumstances. For example, if the object and the 3D recording medium are both present in a darkened chamber or hall, the exposure can be effected by very briefly illuminating the object. In this event, however, the 3D recording medium must be shielded from illumination at its back side as well as its lateral sides. Likewise, when the exposure is effected using roentgen radiation, only a shielding of the 3D recording medium by a material non-transparent to light is required, for example a wrapping foil, in which event both the camera and the darkened chamber or hall become unnecessary. In the case of a prolonged irradiation ($\gamma$-radiation), however, a camera is again necessary, and one provided with a casing non-transparent to light and also to roentgen radiation.

Finally, with respect to the actual recording exposure, it should be noted that the inventive recording medium can also be exposed using a conventional objective camera, if the camera is provided with a deep enough image-space box, so that the 3D recording medium can be located back of the image-space plane, as considered in the direction of entering light, so as to be located in the path of divergent light rays. In this way, three-dimensional diapositive images can be produced in a one-viewpoint or two-viewpoint (stereoscopic) procedure, as well as enlargements and reductions.

The advantages of the inventive three-dimensional multi-viewpoint reproduction technique can be achieved in television contexts, too. The 3D image information is transmitted in per se known manner to a receiver. The receiver includes a specially designed television set with a scattered-light image screen for from-the-rear electronic projection of the 3D image information. This television set includes an aperture raster arranged in front of the image screen, i.e., at the side of the image screen facing the viewer. The aperture raster is provided with lenses located in the raster apertures. The arrangement of the aperture raster in front of the image screen, which latter may be considered to correspond to the photographic plate discussed earlier, leads to a reproduction like that obtained when illuminating the exposed recording medium with diffuse light originating from within the image space. The image of the object actually seen by the viewer is a real image and is located in front of the television set. Evidently, the reproduction is successful only if a certain design is used for the aperture raster and if the aperture raster is arranged in a certain way in front of the image screen, so as to correspond to the relationships existing during the recording performed in the television studio, where likewise an aperture raster was employed to record a sequence of images.

In this context the intermediate position-reversal step referred to earlier is again necessary, for the reasons already explained. The arrangement of the lenses in the apertures of the raster located in front of the image screen have the effect, that of the rays emanating from each image point on the scattered-light image screen, only those actually reach the eye of the observer as correspond to the original ray direction of such image point during the original recording of the illuminated object.

The concepts and teachings of the present invention can also be utilized for the projection of film strips or motion-picture film. Use is made of a film projection set-up which, according to the present invention, includes a large light-scattering ground glass screen for from-the-rear projection of the 3D image information, as well as an aperture raster located in front of the screen, i.e., at the viewer's side of the screen, the apertures of the raster each being provided with a respective lens element. All that was said above with respect to the 3D television set likewise applies to the 3D film projection set-up in question.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
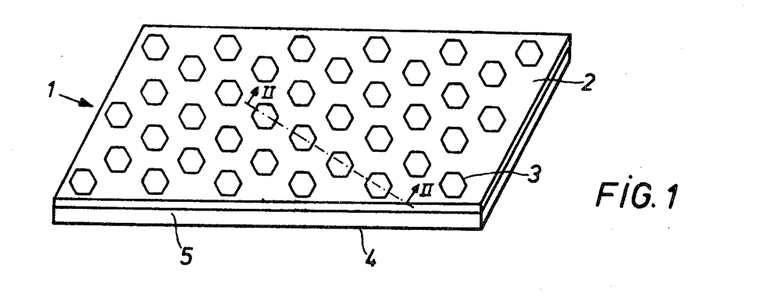
FIG. 1 is a perspective view of an inventive recording medium.

FIG. 1 depicts a plate-shaped 3D recording medium or 3D image carrier 1. Recording medium 1 is provided on its upper side with an aperture-raster plate 2 having apertures 3, and on its lower side with a photographic plate 4 and a spacing plate 5 between the aperture-raster plate 2 and the photographic plate 4. The apertures 3 are shaped as regular (equiangular, equal-sided) hexagons and are so distributed that, with the exception of the apertures 3 located at the edge portions of the 3D image carrier 1, each aperture 3 is surrounded by six equally spaced apertures. The apertures 3 are accordingly distributed with triaxial symmetry; the first axis corresponds to the section line II—II, whereas the other two axes intersect that line at angles of 60°.

Figure 2:
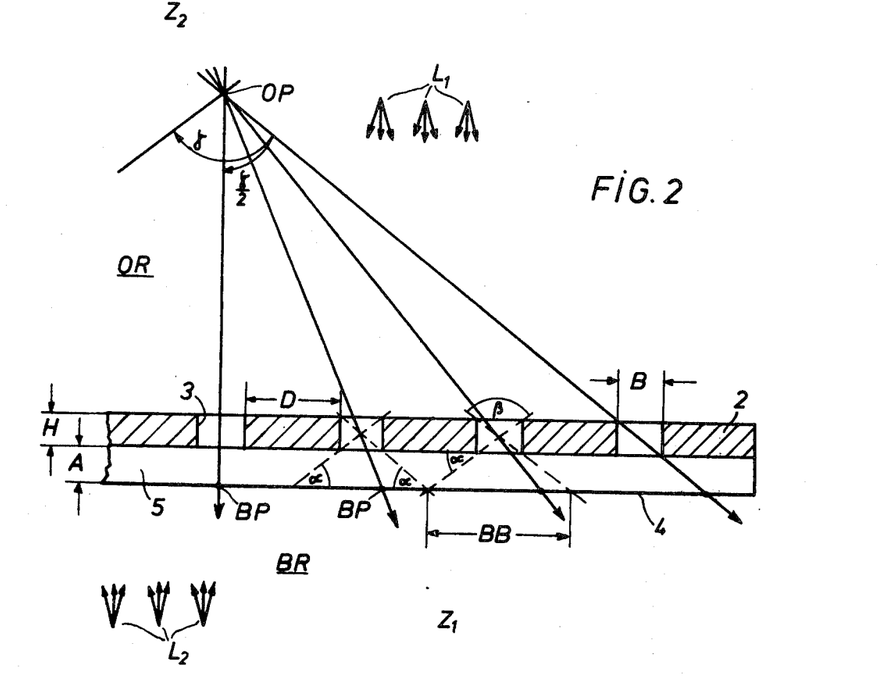
FIG. 2 is an enlarged partial view along line II—II in FIG. 1, showing the relationships existing during exposure and reproduction.

FIG. 2 depicts the right half of the 3D image carrier 1 along the section plane II—II. The spacing between the aperture-raster plate 2 and the photographic plate 4 is denoted by A, the breadth of the apertures 3 by B, the spacing between neighboring apertures by D, and the height or thickness of the aperture-raster plate 2 by H. For two neighboring apertures 3 shown in FIG. 2, there are drawn in the most extreme rays which can actually pass through the aperture and fall upon the photographic plate 4. Each limit ray makes an angle $\beta$ with the photographic plate 4. The two limit rays for each aperture together determine the object-space aperture angle $\beta$. When effecting the exposure, there passes through each raster aperture 3, in the manner of a pinhole camera, image light within the range defined by the limit rays, and this image light is projected onto the photographic plate 4 to form an individual image having an image breadth BB. As can be seen in FIG. 2, the dimensions in question are so chosen that adjoining individual images do not overlap, but instead just touch each other. This leads to the following relationships:

$$\tan \alpha = H:B = 2A:D = 2(A + H/2):BB$$

$$D + B = BB$$

$$\beta = 180° - 2\alpha$$

The recording or exposure operation for the 3D recording medium 1 is depicted for an object point OP located in the object space OR. The rays of exposure light emanating from object point OP pass through the raster apertures 3 and fall upon the photographic plate 4 upon which they form an image point BP which constitutes a measure of light intensity. The image point BP, together with the associated raster aperture 3, determine the direction of the incident rays of exposure light, so that during the exposure operation the direction and intensity of the light vectors representative of the incident light can be registered.

The definition of each light vector will be the more exact, the smaller B is relative to A. However, B must be at least so great as to avoid diffraction of the incident light — i.e., B must be greater than the wavelength $\lambda$ of the (red) exposure light, so that the following relationship must be maintained: $B > 1 \mu m$.

On the other hand, the intensity of the reproduced object point OP should be made large by registering on plate 4 as many light vectors as possible for the light emanating from the object. This can be achieved by keeping the distance D as small as possible, or equivalently by increasing the number of apertures per unit surface area of the aperture-raster plate. Furthermore, it will be desired to register, per individual aperture 3 or per individual image, as many light vectors of different direction and intensity as possible; this corresponds to the greatest possible object-space aperture angle $\beta$. However, because of the relationships mentioned before, this means that $\tan \alpha$ must be small and accordingly the inter-aperture spacing D large.

Based upon the foregoing conflicting optimization factors, and observing the above-stated relationships, one arrives at, for example, numerical values suitable for 3D recording and reproduction; these can of course be varied:

$\tan \alpha = \frac{1}{4}$ $B = 2H$ $D = 100B$ $A = 25B$ $B = 10 \mu m.$

In FIG. 2, there is indicated for the object point OP the angular range of possible viewing locations γ considered relative to the section plane II—II. This range corresponds to the angular range of viewpoints which an observer of the 3D reproduction has available. Since FIG. 2 depicts only the right half of the 3D image carrier, there is depicted only one half the total angular range of possible viewing locations.

In FIG. 2, two ways of reproducing the 3D image information present on the 3D recording medium 1 are schematically indicated. In the first, the observer $Z_1$ is located in the image space BR and looks at the exposed and developed photographic plate 4, while at the same time the 3D recording medium 1 is illuminated by diffuse light from a light source $L_1$ located within the object space, i.e., the light source $L_1$ and the observer $Z_1$ are located at opposite sides of the recording medium 1. As a result, the light which both passes through the image point BP and falls upon the eye of the observer $Z_1$ will have exclusively that direction which the exposure light for the image point BP had during the recording operation.

The illuminating light passing through the photographic plate 4 and reaching the observer $Z_1$ has the light intensity (brightness and possibly also color) registered in the corresponding image point BP. Accordingly, the exposure light configuration which existed during the recording operation is recreated during the reproduction. The observer $Z_1$ sees behind the 3D recording medium 1 the reproduced image of the object, and this image has a three-dimensional character. If the observer changes his viewing location, but remains within the angular range of possible viewing locations γ, he will obtain a different view of the object.

The reproduction can be effected in a second way. The 3D recording medium 1 can be illuminated by diffuse light from a light source $L_2$ located in the image space, with the observer $Z_2$ being located in the object space OR at a sufficient distance from the recording medium. In this case, the observer $Z_2$ perceives the object as real and graspable and as located in front of the 3D reproduction carrier 1, with the object space OR presenting the observer with the effect of a stage. With this reproduction procedure, the aforementioned position-reversal expedient must be resorted to.

At this point, it should be noted that, between the recording and reproduction operations, the 3D recording medium will be manipulated or the relative arrangement between the aperture-raster plate 2 and the photographic plate 4 will be altered, so as to maintain during reproduction the same $\tan \alpha$ condition as prevailed during recording. With this in mind, it is possible to take, for example, the photographic plate 4 and enlarge, reduce or copy it, or else to replace the aperture-raster plate 2 used during the exposure with another raster plate to be used for reproduction.

Figure 3:
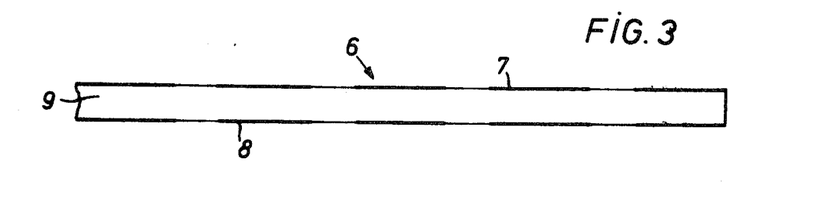
FIG. 3 depicts a preferred embodiment of the aperture-raster plate.

Whereas in FIG. 2 the aperture-raster plate 2 was produced form a single one-piece plate of thickness H, FIG. 3 depicts an aperture-raster plate 6 comprised of two thin aperture-raster foils 7 and 8 the apertures of which are in register. The foils 7, 8 are permanently applied to opposite faces of a transparent spacing foil 9.

Figure 4:
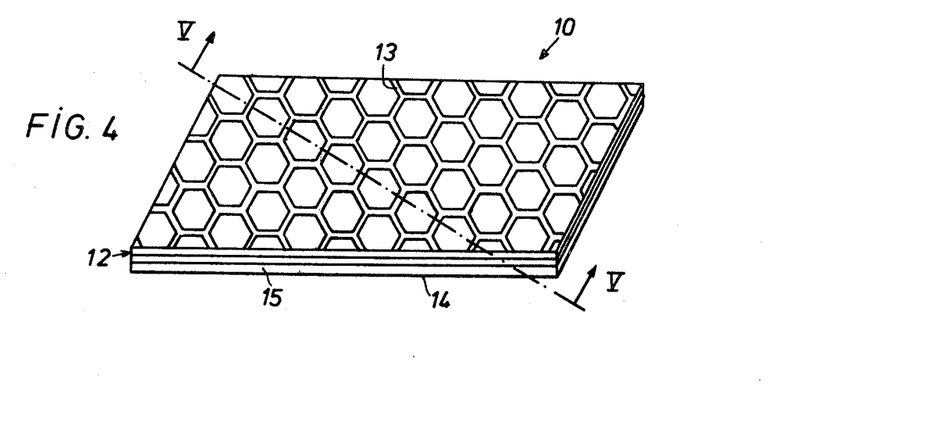
FIG. 4 is a view like FIG. 1 of a 3D recording medium which includes a lens-aperture-raster plate.
Figure 5:
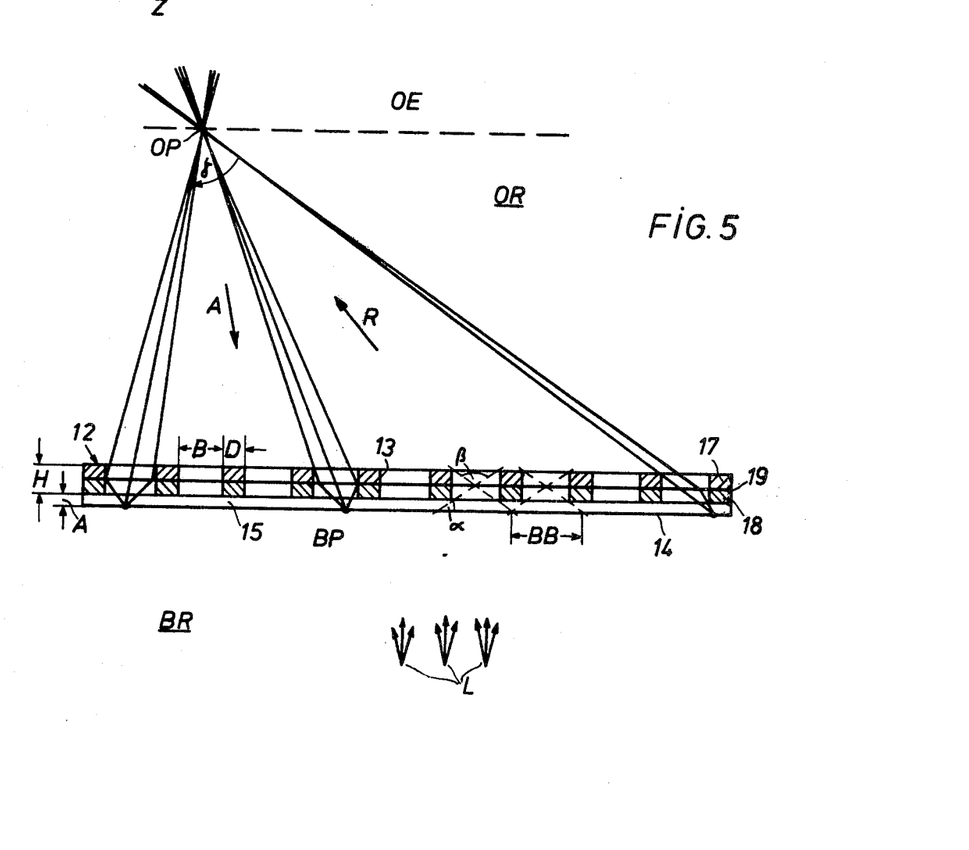
FIG. 5 is an enlarged section taken along line V—V in FIG. 4, showing the ray paths established during exposure and reproduction.

FIGS. 4 and 5 depict another 3D recording medium according to the invention. The relationships involved in this embodiment are the same as those explained with reference to FIG. 2, and accordingly the same characters are employed to indicate dimensions. However, this embodiment is different, in that in the 3D recording medium or image carrier 10 the apertures 13 of the aperture-raster plate 12 are enlarged, so that only narrow strips of breadth D are present between neighboring raster apertures 13. This makes for a comparatively great light incidence available for exposure of the photographic plate 14, which latter as before is joined to the aperture-raster plate 12 by means of a transparent spacing plate 15.

As shown particularly clearly in FIG. 5, the aperture-raster plate 12 is made up of three layers and includes an upper aperture-raster plate 17 and an identical, lower aperture-raster plate 18 and an intermediate spacing foil 19. The spacing foil 19 forms within each raster aperture 13 a collector lens or convex lens, so that the foil 19 can also be referred to as a lens foil. It is made of a material of the highest possible refractive index. Because the focal point of the lenses should be located in front of the photographic plate 14, as considered relative to the exposure direction, the following condition is imposed for the focal length b:

$b < A + H/2.$

An example of optimal dimensioning for the 3D recording medium, as with that of FIGS. 1 and 2, can be given in the following numerical values:

$\tan \alpha = \frac{1}{4}$ $B = 2H$ $D = H$ $A = D/4 = B/8.$

B, because of depth of focus, should be kept as small as possible, and can for example amount to about 1 to 10 mm.

The action produced by the lens foil 19 causes a definite object space plane OE to be sharply focussed onto the photographic plate 14. This is indicated in FIG. 5 for the object point OP located in the object space plane OE. This object point OP is sharply focussed onto the photographic plate 14 as image points BP each located within the individual image of breadth BB associated with the respective raster aperture 13.

The illustrated light ray configuration in the recording direction (exposure direction) A for the focussing of the image points BP, evidences the refractive action of the lens foil 19.

The reproduction of the 3D image information registered on the exposed 3D recording medium 10 is effected in the reproduction ray direction R. To this end, there is arranged in the image space BR a light source L for diffuse light against which the observer gazes. The observer will be located behind the 3D recording medium 10 by an amount exceeding the depth of the object space OR. The image points BP are presented to the observer Z by means of the individual rays derived from the diffuse light rays, these individual rays proceeding in direction opposite to the corresponding rays of exposure light used during the recording operation.

Thus, the reproduction procedure corresponds to the second procedure explained with reference to the recording medium of FIG. 2, i.e., involving the light source $L_2$ and the observer $Z_2$.

To make possible reproduction for an observer located in the image space BR, the aperture-raster plate 12 must be replaced by a small-aperture aperture-raster plate, as explained with reference to FIG. 2. Then, an illumination such as the first one described with respect to FIG. 2 ($L_1$, $Z_1$) is performed. As already explained, in such case it is necessary to maintain the tan α condition.

Figure 6:
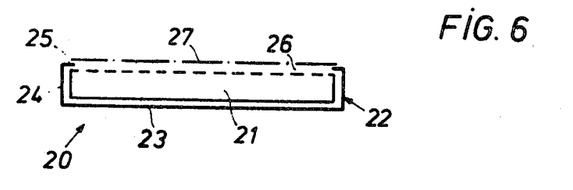
FIG. 6 is a schematic sectional view through a camera containing a 3D recording medium and provided with a quick-action shutter wall.

FIG. 6 depicts a flat camera 20 to be used to expose a 3D recording medium 21. The camera 20 comprises an interiorly blackened case 22 having a back wall 23 whose dimensions match those of the recording medium 21, as well as four narrow wide walls 24. A holder 25 is provided for properly positioning the 3D recording medium or image carrier 21 within the case 22. The case 22 is provided at its front side with a large exposure opening 26, and with a shutter wall 27 (indicated in broken lines) for closing off the opening 26. When the shutter wall 27 is activated, it very briefly unblocks the large exposure opening 26. Camera 20 is suited for recording an object or object space persistently illuminated by daylight or artificial lighting.

Figure 7:
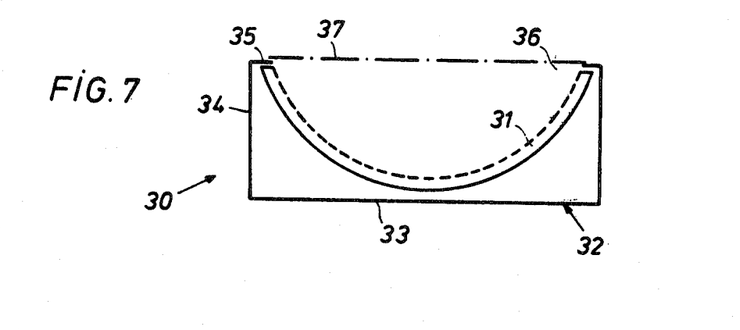
FIG. 7 is a view like FIG. 6 of a camera to be used when the 3D recording medium is curved to form a curved 3D image carrier.

FIG. 7 depicts another such camera 30. Camera 30 differs from camera 20 of FIG. 6 in that it has a greater depth and is adapted to expose a 3D image carrier 31 which has been curved into a cylindrical shape. Camera 30, too, is comprised of a case 32 with a back wall 33, side wall 34 having a depth determined by the curvature of the recording medium 31, as well as a holder 35. The large-area camera opening 36 has associated with it a shutter wall 37 indicated in broken lines.

The camera 20 is provided especially for the case where the object is to be recorded with a large angular range of possible viewing locations γ. Evidently, by arranging several cameras one next to the other, somewhat along the length of the arc of a circle, an object to be recorded can be completely surrounded by 3D recording medium; and, by simultaneously exposing all the 3D image carriers 31, 3D image information for a 360° angular range of possible viewing locations will be achieved, so that the reproduced object can be circuited by the observer and viewed from all sides. In some situations, it may be possible to achieve a comparable result by arranging a plurality of planar 3D image carriers along the cords of a circle surrounding the object to be recorded.

Figure 8:
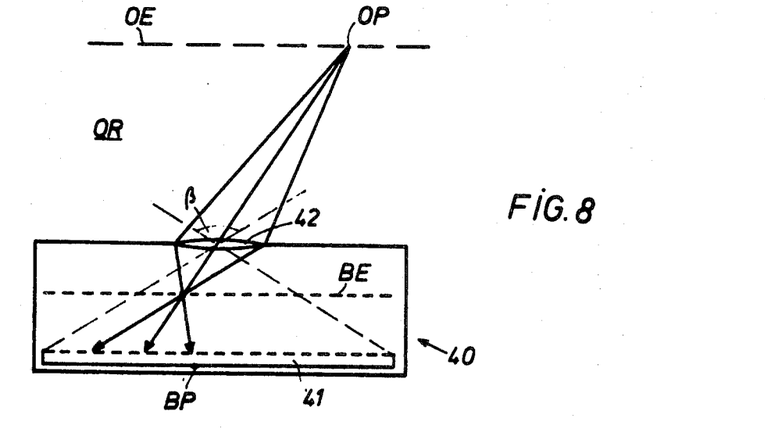
FIG. 8 is a schematic sectional view of the camera having an objective, showing the arrangement of the 3D recording medium in the path of exposure light.

FIG. 8 depicts a further camera 40 for exposing a 3D recording medium 41. This camera is provided in conventional manner with an objective 42 built into a comparatively small exposure opening in the camera 40. Likewise, a conventional (non-illustrated) camera shutter is provided, so that what is involved is hardly more than a conventional camera such as hitherto used for taking one-viewpoint pictures. However, the camera 40 is provided with a large or deep image-space box.

As shown, the 3D recording medium 41 is arranged with spacing behind the image plane BE, in which is focussed an object point OP located in the object plane OE to be recorded. In this way, as shown in FIG. 8, a plurality of image points BP are formed on the 3D recording medium 41 from the single object point OP.

Because of the narrow section of exposure rays which actually pass through the objective 42, with this recording procedure it is not possible to achieve a circuiting of the object with a registration of different views of the object. However, the method which can be performed with the illustrated camera 40 is suitable for the production of three-dimensional slides and films in accordance with one-viewpoint or two-viewpoint (stereoscopic) techniques, as well as for the production of three-dimensional enlargements or reductions of an object or object space.

Figures 9, 10:
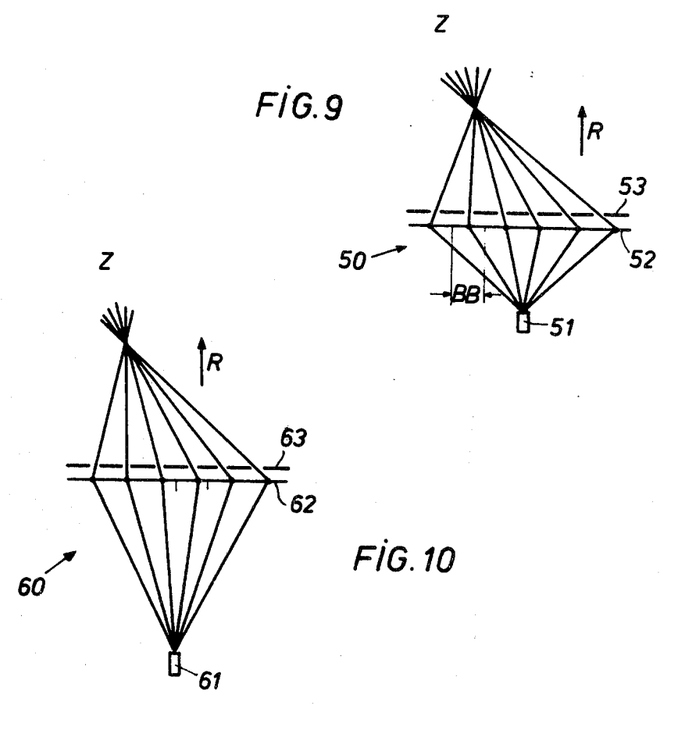
FIG. 9 schematically depicts a portion of a television set for use in three-dimensional reproduction, showing the reproduced light configuration.
FIG. 10 is a view like FIG. 9 of a portion of a film projection set-up which can be used for projection of 3D motion-picture film.

FIG. 9 depicts part of a television set 50, in which an electron gun 51 projects onto the rear side of a light-scattering ground glass screen 52 a televised image. This projected image corresponds to the image recorded on the photographic plate of one of the aforedescribed 3D recording media. I.e., it consists of a series of individual images of breadth BB arranged one next to the other as shown in FIG. 9.

In order to properly process this image information, an aperture-raster plate 53 is arranged in front of the screen 52 spaced therefrom, and with the tan α condition fulfilled. Collector lenses are built into the apertures of the aperture-raster plate 53.

As a result, an observer Z located far enough in front of the television set 50 will perceive scattered light rays which, in correspondence to this viewing location, will convey a complete view of the object reproduced in direction R. The object space for the observer Z will appear like a stage in front of the television set 50.

FIG. 10 depicts a film projection set-up which essentially corresponds to the television set discussed with respect to FIG. 9. By means of a projector 61, the image information in a quick image sequence is projected onto the back side of a large mat screen, in front of which arranged with spacing an aperture-raster wall 63 in the apertures of which collector lenses are provided. As indicated, each image projected onto the mat screen is made up of a series of individual images each of which is arranged behind a respective one of the raster apertures. Here, too, the observer Z looks in direction opposite to the reproduction ray direction R and sees the reproduced object space in the manner of a stage located in front of the aperture-raster wall 63.

It will be understood that each of the elements described above, or two or more together, may also find a useful application in other types of constructions differing from the types described above.

While the invention has been illustrated and described as embodied in methods and arrangements for making three-dimensional recordings of physical objects, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A novel method of photographically recording and three-dimensionally reproducing an object so as to present to an observer of the reproduction a view of the object which changes in dependence upon the changing viewpoint of the observer, the method being of the type wherein the three-dimensional recording medium employed comprises a photographic plate and an aperture-raster plate which is parallel to but spaced a predetermined distance away from the photographic plate, the aperture-raster plate being provided with a multitude of regularly distributed apertures, the method furthermore being of the type comprising the steps of illuminating the object to be recorded and registering the light rays emanating from the illuminated object on the three-dimensional recording medium with respect to both intensity and direction of such rays, and thereafter three-dimensionally reproducing the object by illuminating the three-dimensional recording medium with light which is incident upon the recording medium in the direction opposite to that in which the observer views the recording medium, the improvement comprising using for the three-dimensional recording medium a recording medium of the type defined above, but with the thickness of the aperture-raster plate and the spacing between the aperture-raster plate and photographic plate having values such that, if the medium is exposed to omnidirectional light, the elementary images projected onto the photographic plate by the individual apertures substantially abut and are neither appreciably spaced apart nor overlapping, performing the recording of the light rays emanating from the illuminated object using omnidirectional light and without the use of a lens intermediate the object and the recording medium, and performing the three-dimensional reproduction using omnidirectional light.

2. The method defined in claim 1, the step of reproducing the object comprising positioning the observer in the image space of the recording medium and effecting the illumination of the recording medium using a source of diffuse light located at that side of the recording medium at which is located the object space of the recording medium.

3. The method defined in claim 1, the step of reproducing the object comprising positioning the observer in the object space of the recording medium at a distance from the recording medium exceeding the object distance used during the recording step, and effecting the illumination of the recording medium required for the three-dimensional reproduction using a source of diffuse light located in the image space of the recording medium.

4. The method defined in claim 1, the method being used for making a motion-picture recording of the object and three-dimensionally reproducing the motion-picture recording, the method comprising using for the recording medium a photographic film corresponding to a succession of such photographic plates, and keeping the aperture-raster plate stationary while moving the photographic film relative thereto during the recording and reproducing steps.

5. In an apparatus capable of reproducing the image information recorded by the method of claim 1, image-reproducing means comprising a light-scattering image screen and located in front of the image screen spaced a predetermined distance therefrom a lens-aperture raster, the geometry of the lens-aperture raster corresponding to that of the aperture-raster plate of the recording medium used to record the image information, the thickness of the lens-aperture raster and the spacing between the latter and the image screen having a relationship corresponding to the relationship between the thickness of the aperture-raster plate and spacing between the aperture-raster plate and photographic plate of the recording medium.

6. A recording medium for use in photographically recording and three-dimensionally reproducing an object so as to present to an observer of the reproduction a view of the object which changes in dependence upon the changing viewpoint of the observer, the recording medium comprising, in combination, a photographic plate, and an aperture-raster plate, the aperture-raster plate being parallel to but spaced a predetermined distance away from the photographic plate, the aperture-raster plate being provided with a multitude of regularly distributed apertures, the thickness of the aperture-raster plate and the spacing between the aperture-raster plate and photographic plate having values such that, when the recording medium is exposed to omnidirectional light, the elementary images projected onto the photographic plate by the individual apertures substantially abut and are neither appreciably spaced apart nor overlapping.

7. The recording medium defined in claim 6, further including a transparent spacing plate intermediate the photographic plate and the aperture-raster plate.

8. The recording medium defined in claim 6, the aperture-raster plate comprising two identical and registering aperture-raster foils parallel to but spaced apart from each other.

9. The recording medium defined in claim 8, the aperture-raster plate further including a transparent spacing foil sandwiched between the two aperture-raster foils.

10. The recording medium defined in claim 6, the aperture-raster plate bearing photographically produced apertures.

11. The recording medium defined in claim 6, the apertures of the aperture-raster plate being distributed in a honeycomb pattern having triaxial symmetry.

12. The recording medium defined in claim 11, the apertures each being of regular hexagonal shape.

13. The recording medium defined in claim 6, the portions of the aperture-raster plate surrounding the apertures thereof being comprised of a roentgen-radiation-impervious shielding material.

14. An apparatus for making three-dimensional recordings of objects, comprising an interiorly blacked camera housing made of a material non-transparent for light and having an exposure opening, a three-dimensional recording medium located in the camera housing, a holder in the camera housing for properly positioning the recording medium therein, the holder being located immediately back of the exposure opening, a shutter wall operative for briefly unblocking the exposure opening to effect exposure of the three-dimensional recording medium, the three-dimensional recording medium comprising a photographic plate, and an aperture-raster plate, the aperture-raster plate being parallel to but spaced a predetermined distance away from the photographic plate, the aperture-raster plate being provided with a multitude of regularly distributed apertures, the thickness of the aperture-raster plate and the spacing between the aperature-raster plate and photographic plate having values such that, when the recording medium is exposed to omnidirectional light, the elementary images projected onto the photographic plate by the individual apertures substantially abut and are neither appreciably spaced apart nor overlapping, the portion of the exposure opening briefly unblocked by the shutter wall being of a shape and a size so great as to expose the recording medium to omnidirectional light.

15. The apparatus defined in claim 14, the recording medium being curved and concave with respect to the exposure opening of the camera case.

16. The apparatus defined in claim 14, the camera case additionally being impervious to roentgen radiation.

* * * * *